US012024064B2

(12) United States Patent
Abe

(10) Patent No.: US 12,024,064 B2
(45) Date of Patent: Jul. 2, 2024

(54) SOLAR POWER GENERATION CONTROL DEVICE

(71) Applicant: HONDA MOTOR CO., LTD., Tokyo (JP)

(72) Inventor: Noriyuki Abe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 748 days.

(21) Appl. No.: 17/189,992

(22) Filed: Mar. 2, 2021

(65) Prior Publication Data
US 2021/0291666 A1    Sep. 23, 2021

(30) Foreign Application Priority Data
Mar. 19, 2020   (JP) ................. 2020-050282

(51) Int. Cl.
*B60L 8/00* (2006.01)
*H02S 10/40* (2014.01)
*H02S 50/00* (2014.01)

(52) U.S. Cl.
CPC .............. *B60L 8/003* (2013.01); *H02S 10/40* (2014.12); *H02S 50/00* (2013.01)

(58) Field of Classification Search
CPC ........... B60L 8/003; H02S 10/40; H02S 50/00
USPC ....................................... 320/102
See application file for complete search history.

(56) References Cited

U.S. PATENT DOCUMENTS

| 2012/0098480 | A1* | 4/2012 | David | H02J 7/007194 |
|---|---|---|---|---|
|  |  |  |  | 320/101 |
| 2020/0274368 | A1* | 8/2020 | Crouse, Jr. | B64U 50/19 |
| 2020/0274371 | A1* | 8/2020 | Kirleis | B64D 27/24 |
| 2022/0224278 | A1* | 7/2022 | Wright | B60H 1/00428 |
| 2023/0370016 | A1* | 11/2023 | Chung | H02J 7/35 |
| 2023/0391318 | A1* | 12/2023 | Pursifull | G05D 1/0278 |

(Continued)

FOREIGN PATENT DOCUMENTS

| CN | 104104309 A | * 10/2014 |
|---|---|---|
| CN | 104104309 A | 10/2014 |

(Continued)

OTHER PUBLICATIONS

Sep. 5, 2023, Translation of Japanese Office Action Issued for related JP Application No. 2020-050282.

*Primary Examiner* — Suresh Memula
(74) *Attorney, Agent, or Firm* — Paratus Law Group, PLLC

(57) ABSTRACT

A solar power generation control device, controlling a solar power generation system configured to charge a power storage device of a vehicle with electric power generated by a plurality of solar cells provided on different surfaces of a vehicle body respectively, includes: an acquisition unit configured to acquire information indicating an output of each solar cell; a determination unit configured to determine, based on the information indicating an output of the solar cell acquired by the acquisition unit, a startup solar cell that causes power generation for charging the power storage device to be performed; and a control unit configured to cause charging of the power storage device with electric power generated by the startup solar cell determined by the determination unit to perform, and cause charging of the power storage device with electric power generated by another solar cell different from the startup solar cell to stop.

4 Claims, 4 Drawing Sheets

(56) References Cited

U.S. PATENT DOCUMENTS

2023/0391361 A1* 12/2023 Masuda ................ B60W 40/02
2023/0406113 A1* 12/2023 Srivathsan ............. B60K 16/00

FOREIGN PATENT DOCUMENTS

| CN | 106300611 A | 1/2017 | |
|---|---|---|---|
| DE | 102019209414 A1 * | 12/2020 | |
| DE | 102019210179 A1 * | 1/2021 | |
| EP | 3544144 A1 * | 9/2019 | ............. B60L 58/20 |
| EP | 4270782 A1 * | 11/2023 | ............. H02S 50/00 |
| EP | 4279321 A1 * | 11/2023 | ............. B60L 1/003 |
| EP | 4286207 A1 * | 12/2023 | ............. B60L 8/003 |
| JP | 2015-085707 A | 5/2015 | |
| JP | 2016-163473 A | 9/2016 | |
| WO | WO 2015/063556 A1 | 5/2015 | |
| WO | WO-2021156651 A1 * | 8/2021 | |

* cited by examiner

SOLAR POWER GENERATION CONTROL DEVICE

CROSS-REFERENCE TO RELATED APPLICATIONS

The present application claims the benefit of priority of Japanese Patent Application No. 2020-050282, filed on Mar. 19, 2020, the content of which is incorporated herein by reference.

TECHNICAL FIELD

The present invention relates to a solar power generation control device that controls a solar power generation system.

BACKGROUND ART

In the related art, there is a solar power generation system that includes a solar cell and a power storage device, and charges the power storage device with electric power generated by the solar cell. Generally, such a solar power generation system is started when irradiation light to the solar cell is detected (specifically, when an output voltage of the solar cell is larger than a predetermined voltage value), and performs charging of the power storage device with the electric power generated by the solar cell. JP-A-2015-85707 discloses that such a solar power generation system is provided in a vehicle.

In providing the solar power generation system in a vehicle, it is considered to arrange a plurality of solar cells on different surfaces of a vehicle body, respectively. In a case where a plurality of solar cells are arranged on different surfaces of a vehicle body, the power storage device cannot be efficiently charged with electric power generated by the solar cell simply by starting the solar power generation system when there is irradiation light to the solar cell, and there is room for improvement in this respect.

SUMMARY

The present invention provides a solar power generation control device capable of efficiently charging a power storage device with electric power generated by a solar cell when a plurality of solar cells are arranged on different surfaces of a vehicle body, respectively.

Solution to Problem

According to an aspect of the present invention, there is provided a solar power generation control device, controlling a solar power generation system configured to charge a power storage device of a vehicle with electric power generated by a plurality of solar cells provided on different surfaces of a vehicle body respectively, the solar power generation control device including: an acquisition unit configured to acquire information indicating an output of each solar cell included in the plurality of solar cells; a determination unit configured to determine, based on the information indicating an output of the solar cell acquired by the acquisition unit, a startup solar cell that causes power generation for charging the power storage device to be performed from among the plurality of solar cells; and a control unit configured to cause charging of the power storage device with electric power generated by the startup solar cell determined by the determination unit to perform, and cause charging of the power storage device with electric power generated by another solar cell different from the startup solar cell to stop.

According to the aspect of the present invention, when a plurality of solar cells are arranged on different surfaces of a vehicle body, a power storage device can be efficiently charged with electric power generated by the solar cell.

DESCRIPTION OF EMBODIMENTS

Figure 1:
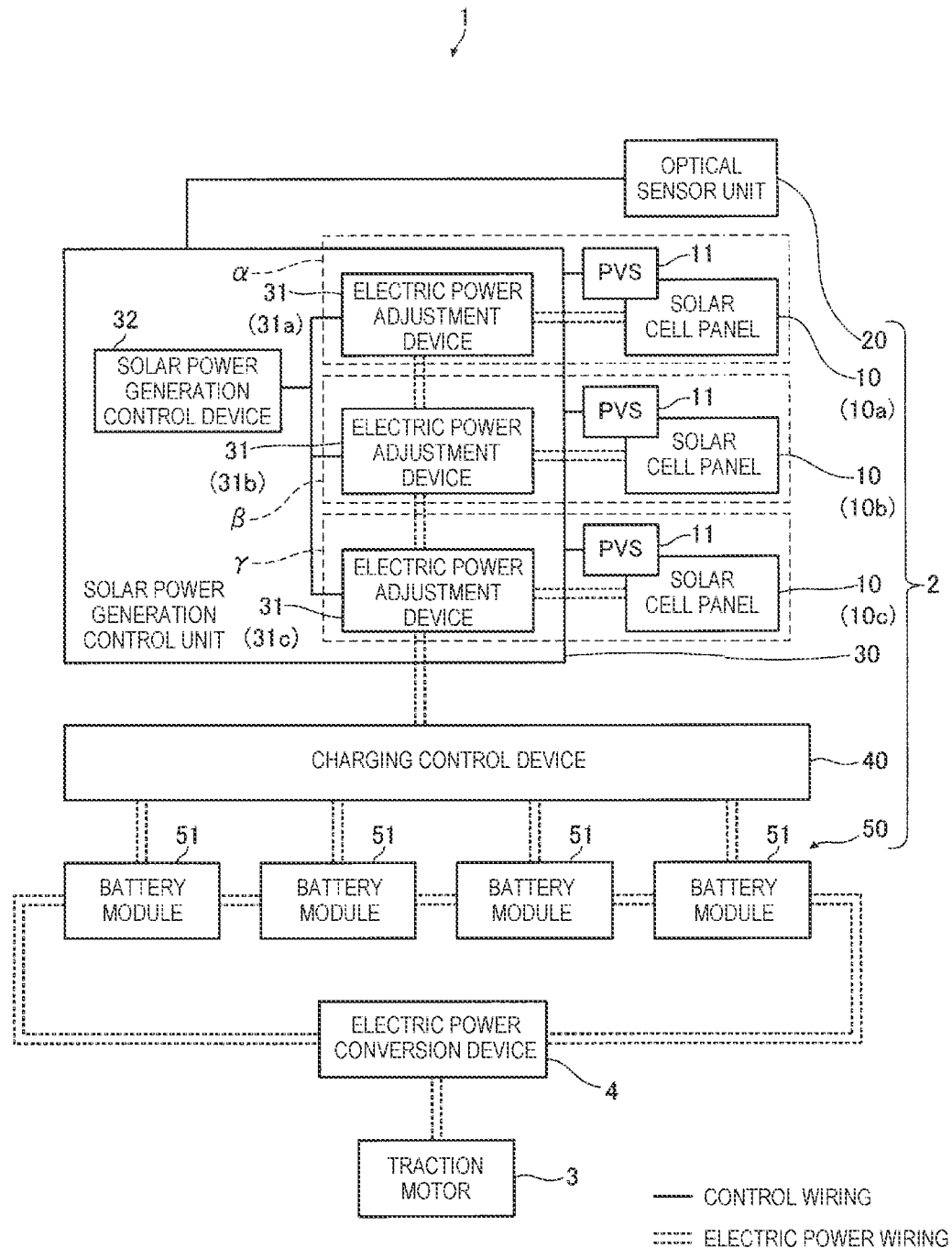
FIG. 1 is a diagram illustrating an example of a vehicle provided with a solar power generation system controlled by a solar power generation control device according to an embodiment of the present invention.

Hereinafter, an embodiment of a solar power generation control device according to the present invention will be described in detail with reference to the drawings. In the following description, front-rear, left-right, and up-down are described according to directions viewed from a user of the vehicle. In the drawings, a front side of the vehicle is indicated as Fr, a rear side as Rr, a left side as L, a right side as R, an upper side as U, and a lower side as D.

First, a vehicle provided with a solar power generation system controlled by a solar power generation control device according to an embodiment of the present invention will be described with reference to FIG. 1. In FIG. 1, a solid line indicates a control wiring, and a double dotted line indicates an electric power wiring.

As illustrated in FIG. 1, a vehicle 1 includes a solar power generation system 2 capable of generating power using irradiation light to the vehicle 1 (hereinafter, also simply referred to as irradiation light), and a traction motor 3 (for example, a three-phase AC motor) that drives by using electric power generated by the solar power generation system 2. The vehicle 1 is an electric vehicle that can run under motive power of the traction motor 3. The irradiation light is, for example, sunlight of the sun serving as a light source. The sunlight may include direct light that directly reaches the ground (that is, the vehicle 1) and scattered light that reaches the ground after being scattered and reflected by clouds, dust in the atmosphere, and the like.

[Solar Power Generation System]

As illustrated in FIG. 1, the solar power generation system 2 includes a solar cell panel 10, an optical sensor unit 20, a solar power generation control unit 30, a charging control device 40, and a battery 50.

The solar cell panel 10 is an example of a solar cell in the present invention. The solar cell panel 10 is configured with, for example, a plurality of solar cells connected in series that convert light energy into electric power, and outputs electric power generated by the plurality of solar cells in the irradiation light to the solar power generation control unit 30. In the vehicle 1, a plurality of such solar cell panels 10 are provided, and each of the plurality of solar cell panels 10 is connected to the solar power generation control unit 30.

Specifically, the solar cell panel 10 includes a solar cell panel 10a, a solar cell panel 10b, and a solar cell panel 10c. The solar cell panel 10a, the solar cell panel 10b, and the solar cell panel 10c are arranged on different surfaces of a vehicle body. An example of arrangement positions of the solar cell panel 10a, the solar cell panel 10b, and the solar cell panel 10c will be described later with reference to FIG. 2.

Although an example in which three solar cell panels 10 of the solar cell panel 10a, the solar cell panel 10b, and the solar cell panel 10c are provided is described in the present embodiment, the present invention is not limited thereto. For example, one or two solar cell panels 10 may be used, or four or more solar cell panels 10 may be provided.

Further, a solar cell sensor unit (illustrated as PVS in FIG. 1) 11 is provided so as to correspond to each solar cell panel 10. The solar cell sensor unit 11 detects an output of the corresponding solar cell panel 10, and sends a detection signal containing both a detection result and an identifier (that is, ID) of the solar cell sensor unit 11 to the solar power generation control unit 30. The solar cell sensor unit 11 detects an output voltage or an output current of the solar cell panel 10 as an output of the solar cell panel 10. Accordingly, the solar power generation control unit 30 (for example, a solar power generation control device 32 to be described later) can acquire information indicating the output voltage or the output current for each solar cell panel 10 based on the detection signal from each solar cell unit 11.

The optical sensor unit 20 includes an optical sensor such as a photodiode that converts light energy into electric power, and is configured to be capable of detecting an intensity (for example, illuminance) of light in a vehicle interior of the vehicle 1 by the optical sensor. Note that the light in the vehicle interior of the vehicle 1 is hereinafter also referred to as vehicle interior light. The optical sensor unit 20 transmits a detection signal containing information indicating the detected intensity of the vehicle interior light to the solar power generation control unit 30. When there is no vehicle interior light, for example, the optical sensor unit 20 sends a detection signal indicating that the intensity of the vehicle interior light is 0 (zero) to the solar power generation control unit 30. Accordingly, the solar power generation control unit 30 (for example, the solar power generation control device 32 described later) can acquire information indicating presence or absence of vehicle interior light and an intensity of the vehicle interior light based on a detection signal from the optical sensor unit 20.

The solar power generation control unit 30 includes an electric power adjustment device 31 and the solar power generation control device 32. A plurality of electric power adjustment devices 31 are provided so as to correspond to the respective solar cell panels 10. Specifically, in the present embodiment, an electric power adjustment device 31a is provided corresponding to the solar cell panel 10a. An electric power adjustment device 31b is provided corresponding to the solar cell panel 10b. An electric power adjustment device 31c is provided corresponding to the solar cell panel 10c.

Each electric power adjustment device 31 receives electric power generated by the corresponding solar cell panel 10, and outputs the received electric power to the charging control device 40. The electric power adjustment device 31 may directly output the electric power generated by the corresponding solar cell panel 10 to the charging control device 40, or may output the electric power to the charging control device 40 via another electric power adjustment device 31.

Each electric power adjustment device 31 controls the electric power generated by the corresponding solar cell panel 10. Specifically, each electric power adjustment device 31 performs maximum power point tracking control (hereinafter, also referred to as MPPT control) so that the electric power generated by the corresponding solar cell panel 10 is maximized. The electric power adjustment device 31 can be implemented with a so-called micro-converter having a function of performing MPPT control, for example.

Hereinafter, a combination of the solar cell panel 10a and the electric power adjustment device 31a may be referred to as a first solar power generation section α. By consuming predetermined electric power (for example, electric power for operating the electric power adjustment device 31a) to operate the first solar power generation section α, the battery 50 can be charged with electric power generated by the solar cell panel 10a.

Further, hereinafter, a combination of the solar cell panel 10b and the electric power adjustment device 31b may be referred to as a second solar power generation section β. By consuming predetermined electric power (for example, electric power for operating the electric power adjustment device 31b) to operate the second solar power generation section β, the battery 50 can be charged with electric power generated by the solar cell panel 10b.

Furthermore, hereinafter, a combination of the solar cell panel 10c and the electric power adjustment device 31c may be referred to as a third solar power generation section γ. By consuming predetermined electric power (for example, power consumption for operating the electric power adjustment device 31c) to operate the third solar power generation section γ, the battery 50 can be charged with electric power generated by the solar cell panel 10c.

The solar power generation control device 32 is an example of the solar power generation control device of the present invention. The solar power generation control device 32 controls, for example, the solar cell panel 10 that performs power generation for charging the battery 50, based on the output of each solar cell panel 10. The solar power generation control device 32 controls, for example, an operation mode of the solar power generation system 2.

In the present embodiment, as the operation mode, the solar power generation system 2 may adopt a startup mode and a pause mode (sleep mode) in which power consumption of the solar power generation system 2 is less than in the startup mode. Specifically, the startup mode is an operation mode in which the battery 50 is charged with the electric power generated by one or more solar cell panels 10.

Specifically, the solar power generation control device 32 can operate or stop each of the solar power generation sections. Further, in the startup mode, the solar power generation control device 32 operates one or more solar power generation sections to charge the battery 50 with the electric power generated by the solar cell panel 10 of the operated solar power generation section. On the other hand, in a solar power generation section whose operation is stopped, for example, the electric power adjustment device 31 turns off functions (for example, a function of performing the MPPT control) except a function of communication with the solar power generation control device 32. Accordingly, since power consumption of the solar power generation section whose operation is stopped is reduced, power consumption of the entire solar power generation system 2 is reduced.

Further, the pause mode is an operation mode in which charging of the battery 50 with the electric power generated by the solar cell panel 10 is not performed. That is, in the pause mode, the operation of all the solar power generation sections is stopped. Further, in the pause mode, not only the electric power adjustment device 31 but also other components (for example, the charging control device 40) may disable a function serving for charging the battery 50 as appropriate. A configuration example of the solar power generation control device 32 will be described later with reference to FIG. 3.

The charging control device 40 receives the electric power generated by the solar cell panel 10 via the solar power generation control unit 30, and charges the battery 50 with the received electric power. The battery 50 is an example of a power storage device in the present invention, and is configured with a plurality of battery modules 51 connected in series. Each of the plurality of battery modules 51 is connected to the charging control device 40, and the charging control device 40 can selectively charge each of the battery modules 51.

For example, the charging control device 40 distributes electric power to the battery modules 51 and charges the battery modules 51 so that remaining capacities of the battery modules 51 are equal. The charging control device 40 can be implemented with a predetermined integrated circuit, for example. The electric power of the battery 50 is supplied to the traction motor 3 via an electric power conversion device 4 that converts a direct current into an alternating current. The electric power conversion device 4 can be implemented with an inverter device, for example.

Figure 2:
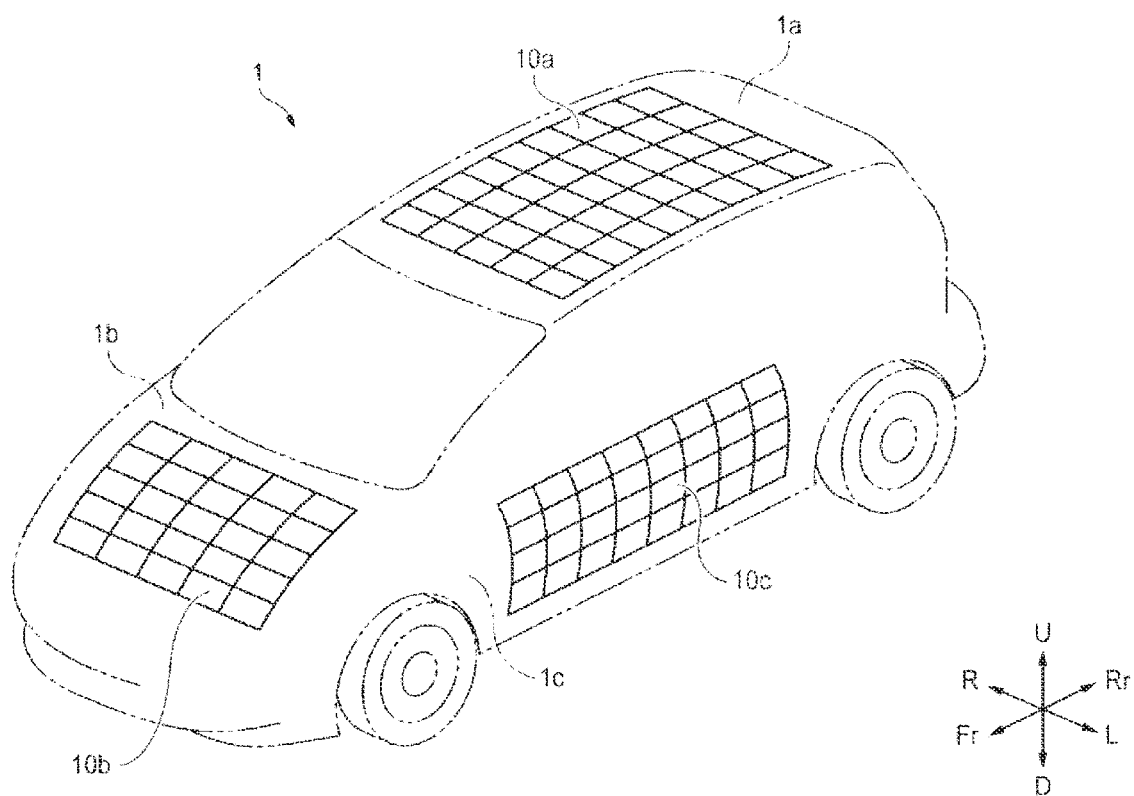
FIG. 2 is a diagram illustrating an example of an arrangement position of each solar cell panel.

Next, an example of an arrangement position of each solar cell panel 10 will be described with reference to FIG. 2. As illustrated in FIG. 2, the solar cell panel 10a is arranged at a roof portion 1a of the vehicle 1 in a state where a light receiving portion thereof capable of receiving the irradiation light faces upward. The solar cell panel 10b is arranged at a hood portion 1b of the vehicle 1 in a state where a light receiving portion thereof capable of receiving the irradiation light faces upward. The solar cell panel 10c is arranged at a left side portion 1c (for example, a left side door) of the vehicle 1 in a state where a light receiving portion thereof capable of receiving the irradiation light faces leftward.

In this manner, the solar cell panel 10a, the solar cell panel 10b, and the solar cell panel 10c are arranged at different positions of the vehicle 1. The solar cell panel 10a, the solar cell panel 10b, and the solar cell panel 10c have sizes corresponding to respective surfaces on which the solar cell panel 10a, the solar cell panel 10b, and the solar cell panel 10c are arranged. For this reason, area of the light receiving portions of the solar cell panels 10 (hereinafter also referred to as a light receiving area) is different from each other.

As described above, in the solar power generation system 2, four or more solar cell panels 10 may be provided, and, for example, similarly to the left side portion 1c of the vehicle 1, a right side portion (for example, a right side door) of the vehicle 1 may be provided with the solar cell panel 10. Although not illustrated and described in detail, the optical sensor of the optical sensor unit 20 is disposed, for example, on a vehicle interior side of the roof portion 1a of the vehicle 1 in a state where a light receiving portion thereof faces the vehicle interior.

Figure 3:
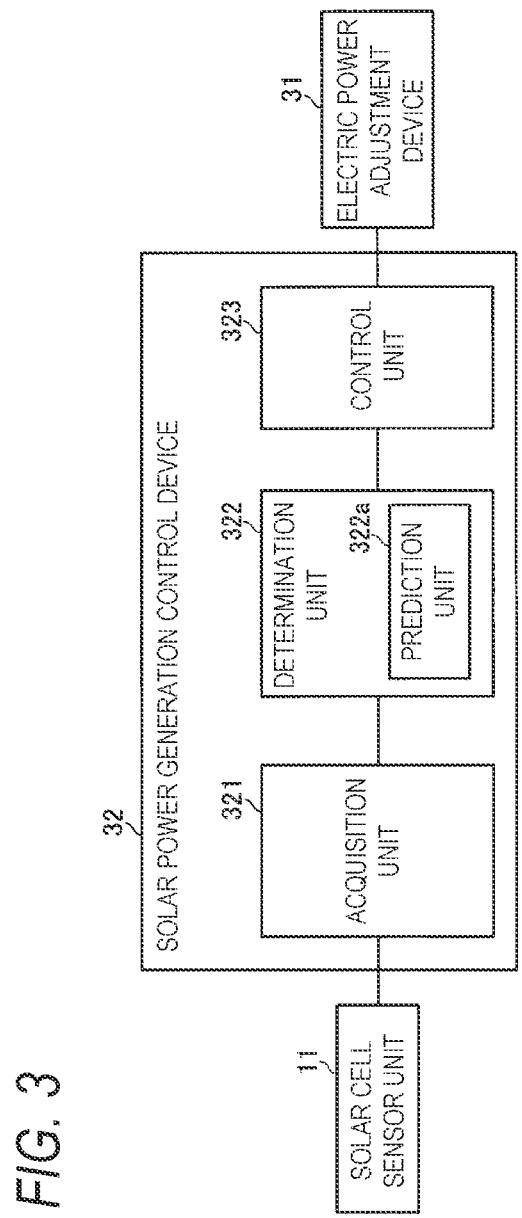
FIG. 3 is a block diagram illustrating a functional configuration example of the solar power generation control device of the present embodiment.

Next, an example of a functional configuration of the solar power generation control device 32 will be described with reference to FIG. 3. As illustrated in FIG. 3, the solar power generation control device 32 includes an acquisition unit 321, a determination unit 322, and a control unit 323.

The acquisition unit 321 acquires information indicating an output of each solar cell panel 10. The acquisition unit 321 acquires, for example, information indicating an output per unit area of each solar cell panel 10, as the information indicating an output of each solar cell panel 10. Here, the output per unit area of a solar cell panel 10 is obtained by dividing generated electric power of the solar cell panel 10 by the light receiving area of the solar cell panel 10. The generated electric power of each solar cell panel 10 can be obtained based on a detection signal from each solar cell sensor unit 11. Further, information indicating the light receiving area of each solar cell panel 10 is stored in advance in, for example, the solar power generation control device 32.

The determination unit 322 determines the solar cell panel 10, which performs power generation for charging the battery 50, from among the plurality of solar cell panels 10 based on the information indicating the output of the solar cell panel 10 acquired by the acquisition unit 321. The determination unit 322 determines, for example, a solar power generation section to be operated to charge the battery 50 based on the output per unit area of each solar cell panel 10.

Specifically, the determination unit 322 determines to operate a solar power generation section including a solar cell panel 10 whose output per unit area is equal to or greater than a threshold. In other words, in this case, the determination unit 322 determines to stop the operation of a solar power generation section including a solar cell panel 10 whose output per unit area is less than the threshold. In addition, information indicating the threshold is stored in advance in, for example, the solar power generation control device 32. In a case where irradiation light to the vehicle 1 is direct light, that is, in a case where scattered light component is not substantially included in the irradiation light to the vehicle 1, the determination unit 322 may determine to operate a solar power generation section including a solar cell panel 10 whose output per unit area is equal to or greater than the threshold.

In addition, the determination unit 322 may determine to operate a solar power generation section whose gain electric power is equal to or greater than 0. That is, in this case, the determination unit 322 includes a prediction unit 322a. For each solar cell panel 10, based on information indicating the output of the solar cell panel 10 and power consumption in a case of charging the battery 50 with electric power generated by the solar cell panel 10, the prediction unit 322a predicts gain electric power in the case of charging the battery 50 with the electric power generated by the solar cell panel 10.

For example, the prediction unit 322a predicts gain electric power in a case of charging the battery 50 with electric power generated by the solar cell panel 10a (hereinafter, also referred to as gain electric power of the first solar power generation section α), based on a difference between generated electric power of the solar cell panel 10a and power consumption of the first solar power generation section α. Specifically, for example, when the generated electric power of the solar cell panel 10a is set as Pa and the power consumption of the first solar power generation section α is set as Pb, the prediction unit 322a predicts Pa-Pb as the gain electric power of the first solar power generation section α.

Similarly, the prediction unit 322a predicts gain electric power in a case of charging the battery 50 with electric power generated by the solar cell panel 10b (hereinafter, also referred to as gain electric power of the second solar power generation section β), based on a difference between generated electric power of the solar cell panel 10b and power consumption of the second solar power generation section β. Further, the prediction unit 322a predicts gain electric power in a case of charging the battery 50 with electric power generated by the solar cell panel 10c (hereinafter, also referred to as gain electric power of the third solar power generation section γ), based on a difference between generated electric power of the solar cell panel 10c and power consumption of the first solar power generation section γ. Note that information indicating the power consumption of each solar power generation sections is stored in advance in, for example, the solar power generation control device 32.

Further, the determination unit 322 may determine a solar power generation section, whose gain electric power is predicted by the prediction unit 322a to be equal to or greater than 0, as a solar power generation section to be operated, and determine a solar power generation section, whose gain electric power is predicted to be less than 0, as a solar power generation section whose operation is to be stopped. In this case, when the scattered light component is included in the irradiation light to the vehicle 1, the determination unit 322 may determine a solar power generation section, whose gain electric power is predicted to be equal to or greater than 0, as a solar power generation section to be operated.

The control unit 323 controls the charging of the battery 50 by the solar power generation system 2 based on a processing result of the determination unit 322. Specifically, the control unit 323 operates a solar power generation section determined to be operated by the determination unit 322, and charges the battery 50 with electric power generated by the solar cell panel 10 of the solar power generation section. The control unit 323 can charge the battery 50 with the electric power generated by the solar power generation section by operating the electric power adjustment device 31 of the solar power generation section determined to be operated.

On the other hand, the control unit 323 stops operation of a solar power generation section other than the solar power generation section determined to be operated by the determination unit 322. For example, the control unit 323 can turn off functions, of the electric power adjustment device 31 of a solar power generation section whose operation is to be stopped, except a function of communication with the solar power generation control device 32, thereby stopping charging of the battery 50 by the solar power generation section.

In this way, the solar power generation control device 32 can operate only the solar power generation section including the solar cell panel 10 whose output per unit area is equal to or greater than the threshold. Accordingly, the solar power generation control device 32 can operate only the solar power generation section including the solar cell panel 10 of which sufficient generated electric power can be expected, and can efficiently charge the battery 50 with the electric power generated by the operated solar power generation section while reducing the power consumption of the solar power generation system 2.

In addition, the solar power generation control device 32 operates only a solar power generation section whose gain electric power is equal to or greater than 0. Accordingly, the solar power generation control device 32 can operate only the solar power generation section whose generated electric power is predicted to be more than power consumption at the time of being operated, and can efficiently charge the battery 50 with the electric power generated by the operated solar power generation section while reducing the power consumption of the solar power generation system 2.

Each of functional parts of the solar power generation control device 32 described above can be implemented by, for example, a central processing unit (CPU) executing a predetermined program (software). A part or all of the functional parts of the solar power generation control device 32 may be implemented with hardware such as large scale integration (LSI), an application specific integrated circuit (ASIC), a field-programmable gate array (FPGA), or a graphics processing unit (GPU), or may be implemented by cooperation of software and hardware.

Next, an example of control processing of the solar power generation system 2 performed by the solar power generation control device 32 will be described with reference to FIG. 4. For example, when the operation mode of the solar power generation system 2 in the pause mode, the solar power generation control device 32 performs the control processing illustrated in FIG. 4.

Figure 4:
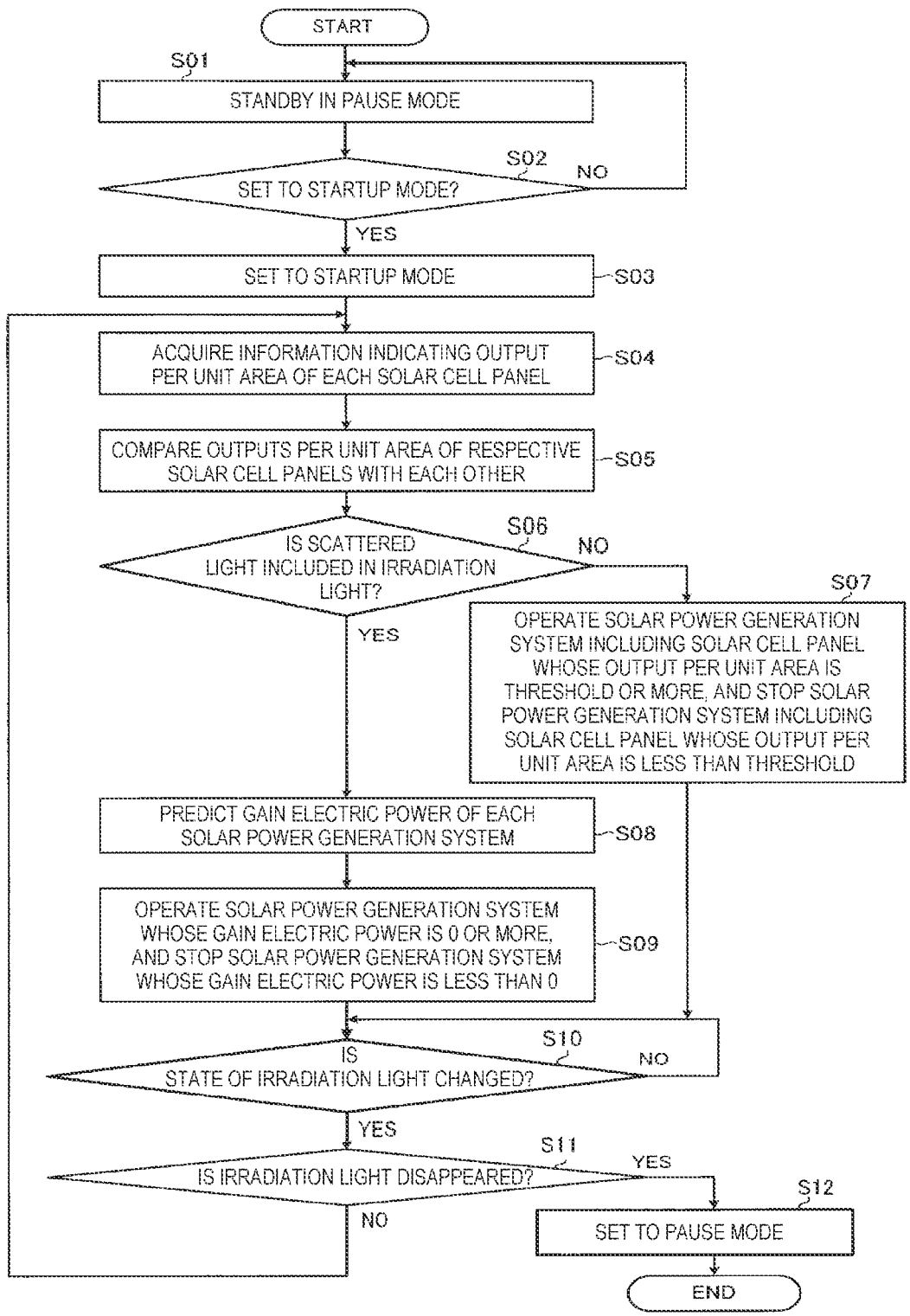
FIG. 4 is a flowchart illustrating an example of control processing performed by the solar power generation control device of the present embodiment.

As illustrated in FIG. 4, first, the solar power generation control device 32 causes the solar power generation system 2 to standby in the pause mode (step S01), and at a predetermined timing determines whether to set the solar power generation system 2 to the startup mode (step S02). In step S02, for example, when an output of any solar cell panel 10 is equal to or greater than the threshold (that is, when any solar cell panel 10 is performing power generation), the solar power generation control device 32 determines that the solar power generation system 2 is to be set to the startup mode. When it is determined that the solar power generation system 2 is not to be set to the startup mode (NO in step S02), the solar power generation control device 32 shifts the process to the processing of step S01.

When it is determined that the solar power generation system 2 is to be set to the startup mode (YES in step S02), the solar power generation control device 32 sets the solar power generation system 2 to the startup mode (step S03), and acquires information indicating an output per unit area of each solar cell panel 10 (step S04).

Next, the solar power generation control device 32 compares the outputs per unit area of the respective solar cell panels 10 with each other (step S05), and determines whether scattered light is included in irradiation light (step S06). In step S06, for example, when differences between the outputs per unit area of the respective solar cell panels 10 are less than a threshold, that is, when the solar cell panels 10 generate electric power approximately equally, the solar power generation control device 32 determines that scattered light is included in the irradiation light.

In step S06, it is desirable that the solar power generation control device 32 also checks a detection result of the optical sensor unit 20. Specifically, in this case, when the differences between the outputs per unit area of the respective solar cell panels 10 are less than the threshold and a difference between illuminance in a vehicle interior and illuminance outside the vehicle is less than a threshold, it is determined that scattered light is included in the irradiation light.

When it is determined that scattered light is not included in the irradiation light (NO in step S06), the solar power generation control device 32 operates a solar power generation section including the solar cell panel 10 whose output per unit area is equal to or greater than the threshold, and stops operation of a solar power generation section including the solar cell panel 10 whose output per unit area is less than the threshold (step S07), and shifts the process to processing of step S10.

When it is determined that scattered light is included in the irradiation light (YES in step S06), the solar power generation control device 32 predicts gain electric power of each solar power generation section (step S08). Further, the solar power generation control device 32 operates a solar power generation section whose gain power is 0 or more, and stops operation of a solar power generation section whose gain electric power is less than 0 (step S09), and shifts the process to the processing of step S10.

Next, the solar power generation control device 32 determines whether a state of the irradiation light to the vehicle 1, for example, an intensity or an irradiation position of the irradiation light, is changed (step S10). When the state of the irradiation light is not changed (NO in step S10), the solar power generation control device 32 waits until the state of the irradiation light changes. When the state of the irradiation light is changed (YES in step S10), the solar power generation control device 32 determines whether the irradiation light is disappeared (whether the intensity of the irradiation light is 0) (step S11). When the irradiation light is not disappeared (NO in step S1*l*), the solar power generation control device 32 shifts the process to the processing of step S04. When the irradiation light is disappeared (YES in step S11), the solar power generation control device 32 sets the solar power generation system 2 to the pause mode (step S12), and ends the control processing illustrated in FIG. 4.

As described above, according to the solar power generation control device 32, when the plurality of solar cell panels 10 are arranged on different surfaces of the vehicle body, the battery 50 can be efficiently charged with the electric power generated by the solar cell panel 10.

The present invention is not limited to the embodiment described above, and modifications, improvements, or the like can be made as appropriate.

For example, in the embodiment described above, the vehicle 1 is described as an electric vehicle, and alternatively the vehicle 1 may be a hybrid electric vehicle or a fuel-cell vehicle (fuel vehicle).

At least the following matters are described in the present description. Components and the like corresponding to the above-described embodiment are shown in parentheses, but the present invention is not limited thereto.

(1) A solar power generation control device (solar power generation control device 32) that controls a solar power generation system (solar power generation system 2) capable of charging a power storage device (battery 50) of a vehicle with electric power generated by a plurality of solar cells (solar cell panels 10) provided on different surfaces of a vehicle body respectively, the solar power generation control device including:

an acquisition unit (acquisition unit 321) that acquires information indicating an output of each solar cell included in the plurality of solar cells;

a determination unit (determination unit 322) that determines, based on the information indicating an output of the solar cell acquired by the acquisition unit, a startup solar cell that causes power generation for charging the power storage device to be performed from among the plurality of solar cells; and a control unit (control unit 323) that causes charging of the power storage device with electric power generated by the startup solar cell determined by the determination unit to perform, and causes charging of the power storage device with electric power generated by another solar cell different from the startup solar cell to stop.

According to (1), based on the information indicating the output of each of the solar cells, the startup solar cell performing power generation for charging the power storage device is determined, the charging of the power storage device with the electric power generated by the determined startup solar cell is performed, and the charging of the power storage device with the electric power generated by another solar cell different from the startup solar cell is stopped. Accordingly, since charging of the power storage device can be performed only by a solar cell of which sufficient generated electric power can be expected, the power storage device can be efficiently charged with the electric power generated by the solar cell.

(2) The solar power generation control device according to (1), in which the acquisition unit acquires information indicating an output per unit area of each solar cell, as information indicating an output of each solar cell.

According to (2), even when sizes of the respective solar cells are different, it is possible to appropriately determine the startup solar cell to be used for charging the power storage device.

(3) The solar power generation control device according to (1) or (2), in which the determination unit determines the solar cell whose output is equal to or greater than a threshold as the startup solar cell.

According to (3), since the solar cell whose output is equal to or greater than the threshold is determined as the startup solar cell, it is possible to determine the solar cell expected to have sufficient generated electric power as the startup solar cell.

(4) The solar power generation control device according to (1) or (2), in which the determination unit includes a prediction unit (prediction unit 322*a*) that, for each solar cell, based on information indicating an output of the solar cell and power consumption in a case of performing charging of the power storage device with electric power generated by the solar cell, predicts gain electric power in the case of performing charging of the power storage device with electric power generated by the solar cell, and in which the determination unit determines the solar cell, the gain electric power of which is predicted by the prediction unit to be equal to or greater than 0, as the startup solar cell.

According to (4), for each solar cell, based on the information indicating the output of the solar cell and the power consumption in the case of performing the charging of the power storage device with the electric power generated by the solar cell, the gain electric power in the case of performing the charging of the power storage device with the electric power generated by the solar cell is predicted, and the solar cell of which the gain electric power is predicted to be equal to or greater than 0 is determined as the startup solar cell. Accordingly, it is possible to determine, as the startup solar cell, a solar cell whose generated electric power is predicted to be more than power consumption thereof at the time of being used for charging the power storage device, and it is possible to efficiently charge the power storage device with the electric power generated by the solar cell.

The invention claimed is:

1. A solar power generation control device, controlling a solar power generation system configured to charge a power storage device of a vehicle with electric power generated by a plurality of solar cells provided on different surfaces of a vehicle body respectively, the solar power generation control device comprising:

processing circuitry configured to
acquire information indicating an output of each solar cell included in the plurality of solar cells;
determine, based on the acquired information indicating an output of the solar cell, a startup solar cell that causes power generation for charging the power storage device to be performed from among the plurality of solar cells; and cause charging of the power storage device with electric power generated by the determined startup solar cell to perform, and cause charging of the power storage device with electric power generated by another solar cell different from the startup solar cell to stop, wherein the processing circuitry is further configured to, for each solar cell, based on information indicating an output of the solar cell and power consumption in a case of performing charging of the power storage device with electric power generated by the solar cell, predict gain electric power in the case of performing charging of the power storage device with electric power generated by the solar cell, and the processing circuitry is configured to determine the solar cell, the gain electric power of which is predicted by the prediction unit to be equal to or greater than 0, as the startup solar cell.

2. The solar power generation control device according to claim 1, wherein the processing circuitry is further configured to acquire information indicating an output per unit area of each solar cell, as information indicating an output of each solar cell.

3. A solar power generation control device, controlling a solar power generation system configured to charge a power storage device of a vehicle with electric power generated by a plurality of solar cells provided on different surfaces of a vehicle body respectively, the solar power generation control device comprising processing circuitry configured to:

acquire information indicating an output of each solar cell included in the plurality of solar cells;

determine, based on the acquired information indicating an output of the solar cell, a startup solar cell that causes power generation for charging the power storage device to be performed from among the plurality of solar cells; and cause charging of the power storage device with electric power generated by the determined startup solar cell to perform, and cause charging of the power storage device with electric power generated by another solar cell different from the startup solar cell to stop, wherein the processing circuitry is configured to acquire information indicating an output per unit area of each solar cell, as information indicating an output of each solar cell, the processing circuitry is configured to determine whether a difference between the output per unit area of each solar cell is less than a first threshold, in a case where it is determined that the difference is equal to or greater than the first threshold, the processing circuitry is configured to determine the solar cell whose output is equal to or greater than a second threshold as the startup solar cell, and in a case where it is determined that the difference is less than the first threshold, the processing circuitry is configured to determine the solar cell whose gain power is 0 or more as the startup solar cell.

4. The solar power generation control device according to claim 3, wherein the processing circuitry is further configured to, for each solar cell, based on information indicating an output of the solar cell and power consumption in a case of performing charging of the power storage device with electric power generated by the solar cell, predict gain electric power in the case of performing charging of the power storage device with electric power generated by the solar cell, and in a case where it is determined that the difference is less than the first threshold, the processing circuitry is configured to determine the solar cell the gain electric power of which is predicted to be equal to or greater than 0 as the startup solar cell.

* * * * *